(12) United States Patent
Marlow et al.

(10) Patent No.: US 9,083,794 B2
(45) Date of Patent: Jul. 14, 2015

(54) PROVISIONING MY STATUS INFORMATION TO OTHERS IN MY SOCIAL NETWORK

(75) Inventors: Cameron Marlow, Santa Clara, CA (US); Neal Sample, Santa Cruz, CA (US); Chris Kalaboukis, Los Gatos, CA (US)

(73) Assignee: YAHOO! INC., Sunnyvale, CA (US)

( * ) Notice: Subject to any disclaimer, the term of this patent is extended or adjusted under 35 U.S.C. 154(b) by 119 days.

(21) Appl. No.: 13/551,431

(22) Filed: Jul. 17, 2012

(65) Prior Publication Data

US 2012/0284338 A1 Nov. 8, 2012

Related U.S. Application Data

(63) Continuation of application No. 11/615,920, filed on Dec. 22, 2006, now Pat. No. 8,224,359.

(51) Int. Cl.
*H04M 11/00* (2006.01)
*H04M 3/42* (2006.01)
*H04L 12/58* (2006.01)
*H04L 12/66* (2006.01)
*H04M 3/53* (2006.01)
(Continued)

(52) U.S. Cl.
CPC ......... *H04M 3/42374* (2013.01); *H04L 12/581* (2013.01); *H04L 12/66* (2013.01); *H04L 51/04* (2013.01); *H04M 3/5322* (2013.01); *H04L 43/0817* (2013.01); *H04L 67/24* (2013.01); *H04M 2203/4536* (2013.01); *H04M 2203/655* (2013.01)

(58) Field of Classification Search
CPC ....... H04W 4/14; H04W 4/12; H04L 12/5895
USPC ................. 455/466, 412.1; 379/88.13, 88.17; 709/206, 207, 223
See application file for complete search history.

(56) References Cited

U.S. PATENT DOCUMENTS

| 6,260,148 B1 | 7/2001 | Aggarwal et al. |
| 6,501,834 B1 | 12/2002 | Milewski et al. |
| 7,120,455 B1 | 10/2006 | Chen et al. |

(Continued)

OTHER PUBLICATIONS

Official Communication for U.S. Appl. No. 12/728,178 mailed Oct. 5, 2010.

(Continued)

*Primary Examiner* — Fan Tsang
*Assistant Examiner* — Van D Huynh
(74) *Attorney, Agent, or Firm* — James J. DeCarlo; Greenberg Traurig, LLP

(57) ABSTRACT

A device, system, and method are directed towards sending a status of a user in a social network to a recipient. In one embodiment, a status of the user is received over a channel. The channel may include an application protocol. The recipient is selected based on a membership in the social network, a preference of the recipient, or a media format of the status. Another channel is selected based on information about a mode of communication between the recipient and the user and/or another member related to the user in the social network. The status may be modified based on social network information, preferences of a recipient, receiving device information, channel information, or the like. The status is forwarded to the recipient over the other channel. Forwarding may comprise unicasting, multicasting, and/or delaying sending the status until the other channel is available.

15 Claims, 5 Drawing Sheets

(51) Int. Cl.
*H04L 12/26* (2006.01)
*H04L 29/08* (2006.01)

(56) References Cited

U.S. PATENT DOCUMENTS

| | | | |
|---|---|---|---|
| 7,272,662 B2 | 9/2007 | Chesnais et al. | |
| 7,548,756 B2 | 6/2009 | Velthuis et al. | |
| 7,603,111 B2 | 10/2009 | Chie | |
| 7,730,135 B2 | 6/2010 | Petrovykh | |
| 7,730,143 B1 | 6/2010 | Appelman | |
| 7,752,268 B2 | 7/2010 | Shah | |
| 7,844,055 B2 | 11/2010 | Mukherjee et al. | |
| 7,996,467 B2 | 8/2011 | Maes | |
| 8,219,126 B2 * | 7/2012 | Marlow et al. | 455/466 |
| 8,224,359 B2 * | 7/2012 | Marlow et al. | 455/466 |
| 2002/0024947 A1 | 2/2002 | Luzzatti et al. | |
| 2002/0083136 A1 | 6/2002 | Whitten | |
| 2003/0009530 A1 | 1/2003 | Philonenko et al. | |
| 2004/0073643 A1 | 4/2004 | Hayes et al. | |
| 2004/0162881 A1 | 8/2004 | Digate et al. | |
| 2005/0027669 A1 | 2/2005 | Day et al. | |
| 2005/0044143 A1 | 2/2005 | Zimmermann et al. | |
| 2005/0071433 A1 * | 3/2005 | Shah | 709/207 |
| 2005/0091329 A1 * | 4/2005 | Friskel | 709/206 |
| 2005/0117570 A1 | 6/2005 | Cetusic et al. | |
| 2005/0153724 A1 | 7/2005 | Vij et al. | |
| 2005/0235035 A1 | 10/2005 | Benejam et al. | |
| 2006/0031234 A1 | 2/2006 | Beartusk et al. | |
| 2006/0265463 A1 | 11/2006 | Amir et al. | |
| 2006/0271696 A1 | 11/2006 | Chen et al. | |
| 2007/0143472 A1 | 6/2007 | Clark et al. | |
| 2007/0198725 A1 | 8/2007 | Morris | |
| 2007/0226357 A1 | 9/2007 | McMurry et al. | |
| 2007/0293212 A1 | 12/2007 | Quon et al. | |
| 2008/0132259 A1 | 6/2008 | Vin | |
| 2008/0141138 A1 | 6/2008 | Kalaboukis et al. | |
| 2008/0153531 A1 | 6/2008 | O'Shaughnessy et al. | |
| 2008/0153538 A1 | 6/2008 | O'Shaughnessy et al. | |
| 2008/0155080 A1 | 6/2008 | Marlow et al. | |
| 2008/0155567 A1 | 6/2008 | O'Shaughnessy et al. | |
| 2008/0261630 A1 | 10/2008 | Wormald et al. | |
| 2009/0063467 A1 | 3/2009 | Abhyanker | |
| 2009/0117936 A1 | 5/2009 | Maeng | |
| 2009/0119400 A1 | 5/2009 | Fukazawa | |
| 2009/0186638 A1 | 7/2009 | Yim et al. | |
| 2009/0234922 A1 * | 9/2009 | Appelman | 709/206 |
| 2009/0234927 A1 * | 9/2009 | Buzescu | 709/206 |
| 2009/0276436 A1 | 11/2009 | Otranen et al. | |
| 2010/0009664 A1 | 1/2010 | Hossain | |
| 2010/0056109 A1 | 3/2010 | Wilson et al. | |
| 2010/0151845 A1 | 6/2010 | Rountree | |
| 2010/0177812 A1 | 7/2010 | O'Shaughnessy et al. | |
| 2010/0203900 A1 | 8/2010 | Khokhlov | |
| 2010/0205267 A1 | 8/2010 | Klassen et al. | |
| 2010/0211604 A1 | 8/2010 | Campbell et al. | |
| 2010/0228582 A1 | 9/2010 | King et al. | |
| 2010/0228826 A1 | 9/2010 | Marlow et al. | |
| 2010/0229107 A1 * | 9/2010 | Turner et al. | 715/757 |
| 2010/0250692 A1 * | 9/2010 | Kaminsky et al. | 709/206 |
| 2010/0262661 A1 | 10/2010 | McColgan et al. | |
| 2010/0318615 A1 * | 12/2010 | Griffin | 709/206 |
| 2011/0040844 A1 | 2/2011 | Lawler et al. | |
| 2011/0041063 A1 | 2/2011 | Lee et al. | |
| 2011/0059727 A1 | 3/2011 | Lisboa | |
| 2011/0143724 A1 | 6/2011 | Zubas et al. | |
| 2011/0171934 A1 | 7/2011 | Lim et al. | |
| 2011/0289149 A1 | 11/2011 | Shmueli et al. | |
| 2012/0046029 A1 | 2/2012 | Sylvain et al. | |
| 2013/0073659 A1 * | 3/2013 | Agrawal | 709/206 |
| 2013/0172025 A1 * | 7/2013 | Odell et al. | 455/466 |
| 2013/0172026 A1 * | 7/2013 | Odell et al. | 455/466 |

OTHER PUBLICATIONS

Official Communication for U.S. Appl. No. 12/728,178 mailed Mar. 11, 2011.
Official Communication for U.S. Appl. No. 12/728,178 mailed Sep. 30, 2011.
Official Communication for U.S. Appl. No. 12/728,178 mailed Apr. 3, 2012.
"What is Twitter?," Twitter.com, 2008, 2 pages.
"What is Twitter?: FAQ," Twitter.com, 2008, 2 pages.
"Dodgeball.com: Get Started," Dodgeball.com, 2008, 2 pages.
"Add Online Presence to Your Web Pages," Yahoo! Messenger, 2008, 1 page.
"Your First Time on imood.com," Jun. 13, 2008, 2 pages.
Official Communication for U.S. Appl. No. 11/615,920 mailed Oct. 6, 2010.
Official Communication for U.S. Appl. No. 11/615,920 mailed Mar. 11, 2011.
Official Communication for U.S. Appl. No. 11/615,920 mailed Sep. 21, 2011.
Official Communication for U.S. Appl. No. 11/615,920 mailed Mar. 26, 2012.
Official Communication for U.S. Appl. No. 12/728,178 mailed Jun. 11, 2012.
Official Communication for U.S. Appl. No. 11/615,920, mailed Jun. 12, 2012.

* cited by examiner

US 9,083,794 B2

PROVISIONING MY STATUS INFORMATION TO OTHERS IN MY SOCIAL NETWORK

CROSS-REFERENCE TO RELATED APPLICATIONS

This utility patent application is a Continuation of copending U.S. patent application Ser. No. 11/615,920 filed on Dec. 22, 2006, the benefit of which is claimed under 35 U.S.C. §120; all of the foregoing applications are incorporated herein by reference in their entireties.

TECHNICAL FIELD

The present invention relates generally to mobile communications and, more particularly, but not exclusively to providing a status of a user in a social network to another user of the social network over a network.

BACKGROUND

Tremendous changes have been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and to otherwise stay in touch.

The development of such online social networks touch countless aspects of our everyday lives, providing instant access to people of similar mindsets, and enabling us to form partnerships with more people in more ways than ever before.

One aspect of our everyday lives that may benefit from online social networking technology involves communicating information about a member in social network to another member in the social network, thereby enhancing the use of the social network and providing more relevance to the social network.

For example, some social networking websites may provide a status of a user in the social network. Moreover, some Instant Messaging (IM) applications may provide an idle/active status of a user of the IM application. However, because of limitations in technology, the information about members may not be sent to a destination that the other member can easily access. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
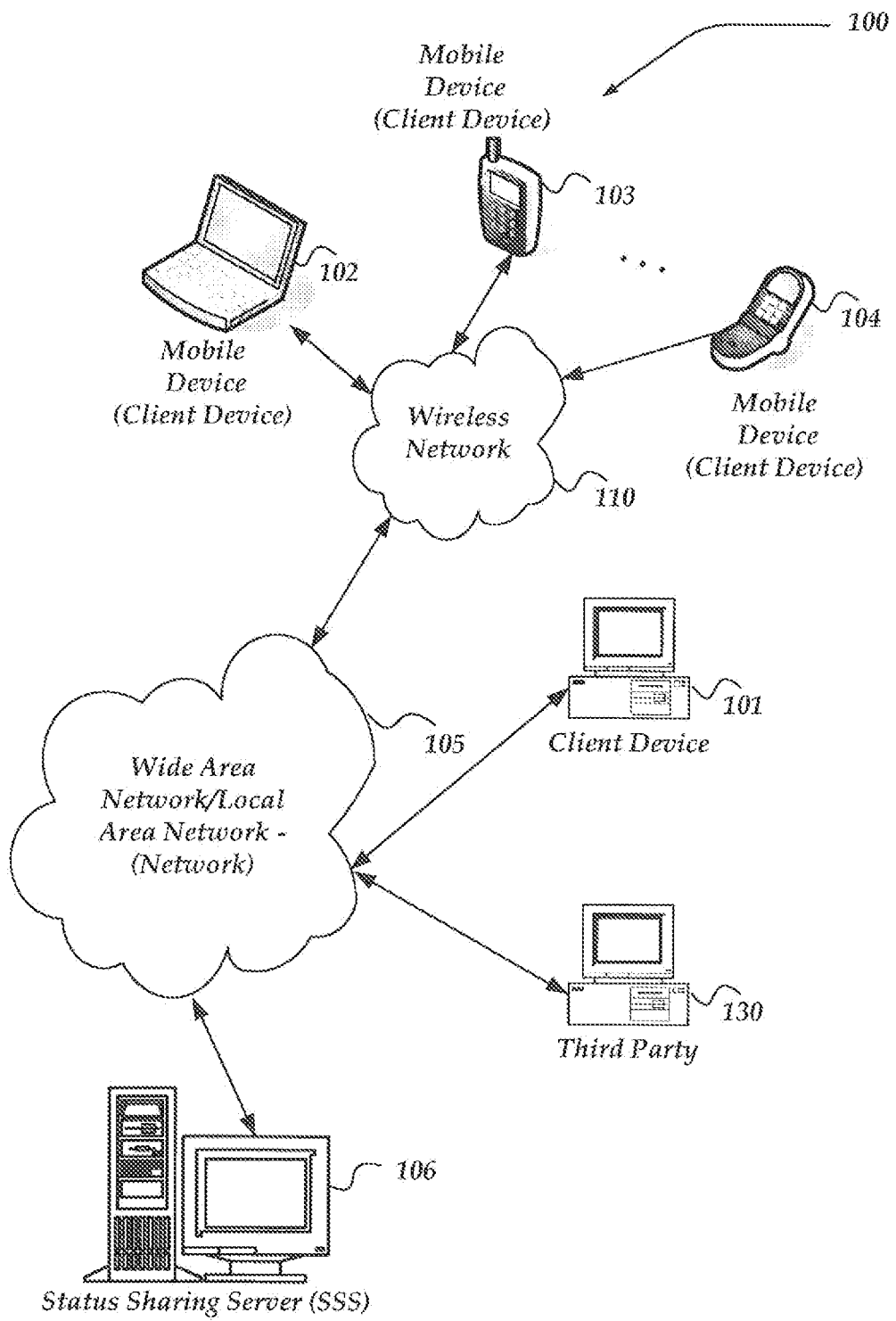
FIG. 1 shows components of an environment in which one or more embodiments of the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein, rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like. Such social network may be created based on a variety of criteria, including, for example, an address book, a social event, an online community, or the like.

As used herein, the term "member" refers to a user who is included in a social network. The term "group" or "community" refers to a collection of members.

The terms "content" or "media" refer to any digital data directed towards, a user of a computing device, including, but not limited to audio data, multimedia data, photographs, video data, still images, text, graphics, animation files, voice messages, text messages, or the like. As used herein, the term "media, format" refers to an encoding or configuration of media. The term "status" refers to any media about a user or member including a mood, a time, a promotion, a location of a mobile device associated with the user, or the like.

The terms "ID," "user ID," or "identity" refer to an identifier for a member. The identifier may include any information useable in identifying the member, including an alphanumeric string, picture, sound, movie clip, or the like. The term "media format" refers to an encoding or configuration of media.

As used herein, the term "channel" refers to any mechanism for communicating over a network, including any combination of sending/receiving applications, application protocol or other network protocols, sending/receiving operating systems or platforms, or the like. The term "application protocol" refers to any network protocols specified at the Open Systems Interconnection (OSI) layer 7 or above.

Briefly stated the various embodiments are directed towards sending a status of a user in a social network to a recipient. In one embodiment, a status of the user is received over a channel. The channel may include an application protocol. The recipient is selected based on a membership in the social network, a preference of the recipient, or a media format of the status. Another channel is selected based on information about a mode of communication between the recipient and the user and/or another member related to the user in, the social network. The status may be modified based on social network information, preferences of a recipient, receiving device information, channel information, or the like. The status is forwarded to the recipient over the other channel. Forwarding may comprise unicasting, multicasting, and/or delaying sending the status until the other channel is available.

Illustrative Operating Environment

FIG. 1 shows components of an environment in which one or more embodiments of the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Status Sharing Server (SSS) 106, mobile devices (client devices) 102-104, client device 101, and third party 130.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheid Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, media content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to SSS 106, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as SSS 106, client device 101, each other, or the like. However, the present invention is not limited to these message protocols, and virtually any other message protocol may be employed. For example, the client application may enable a user to interact with the browser application, email application, VOIP applications, or the like.

Mobile devices 102-104 may further be configured to, include a client application that enables the end-user to log into an end-user account that may be managed by another computing device, such as SSS 106. Such end-user account, for example, may be configured to enable the end-user to receive emails, send/receive Instant Message (IM) messages, SMS messages, access selected web pages, or the like.

In addition, mobile devices 102-104 may include another application that is configured to enable the mobile user to share and/or receive-content, and to display the content. In one embodiment, each of mobile devices 102-104 may share with and/or receive the content from SSS 106 and/or from another one of mobile devices 102-104. For example, content may be shared between the mobile devices using MMS, WAP, or the like. In one embodiment, a mobile device may receive a message indicating the content is available for viewing and/or annotating at a website, or the like.

In conjunction with sharing content, mobile devices 102-104 may enable an interaction with each other, through sharing various messages, and generally participating in a variety of integrated social experiences beyond merely voice communications. For example, a user of one of mobile devices 102-104 may create a group that includes identified members. In one embodiment, members of the group may elect to share content, such as photographs, video clips, audio clips, text messages, emails, or the like, with other members of the group. Moreover, mobile devices 102-104 may enable any of the members of the group to also add other members to the group. Mobile devices 102-104 may also communicate with non-mobile client devices, such as client device 101, or the like. In one embodiment, such communications may include providing information about the content, to a user of client device 101, or the like.

Client device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, or the like. In one embodiment, client device 101 may be configured to access a website, or other location, of shared content, and to annotate the content, add additional content, or the like.

In one embodiment, one of client devices 101-104 may send a status of a user of the device to at least one other device over network 110 and/or network 105. In one embodiment, the status may be sent to SSS 106 over network 110 and/or network 105. In one embodiment, one of client devices 101-104 may send the status to SSS 106 over one channel, such as over an application protocol, and SSS 106 may send the status to another one of client devices 101-104 over another channel, such as over another application protocol. Accordingly, in one embodiment, the other one of client devices 101-104 may receive the status over a push mechanism.

In another embodiment, SSS 106 may provide a pull mechanism for the other one of client devices 101-104 to pull the status (e.g., using polling, a timer, or the like). In another embodiment, the other one of client devices 101-104 may display the received status in a variety of format, including by priority, by media type, in chronological, reverse chronological order, in a gestalt fashion, such as by changing an image of an avatar representing the user, or the like. Client devices 101-104 may employ a process similar to that described below in conjunction with FIG. 5 to perform at least some of its actions.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple SSS 106 and its components with other computing devices, including, mobile devices 102-104, client device 101, and through wireless network 110 to mobile devices 102-104. Network 105 is enabled to employ any form of computer readable media for communicating information from one electronic device, to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between SSS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Devices that may operate as SSS 106 include personal computers desktop computers, multiprocessor systems, microprocessor-based or programmable consumer electronics, network PCs, servers, and the like. One embodiment of SSS 106 is described in more detail below in conjunction with FIG. 3. Briefly, however, SSS 106 may include any computing device capable of connecting to network 105 to enable determination (e.g., creation and/or modification) of a user's social network based on user input. SSS 106 may also be configured to determine the social network of a user(s) based on a plurality of address books, buddy lists, or other social network information from a plurality of other social networks.

SSS 106 may also receive a status of a user from at least one of client devices 101-104 over a channel. SSS 106 may select a recipient and/or another channel to forward the status to the recipient. Before sending the status over the other channel, SSS 106 may also modify the status based on, among other things, social network information, preferences of a recipient, receiving device information, channel information, or the like. SSS 106 may then send the status to at least one of client devices 101-104 over the other channel using a variety of mechanisms, including unicasting, multicasting, broadcasting, multiplexed broadcasting, peercasting, or the like.

As is apparent to one skilled in the art, the status received by SSS 106 is associated with a particular user, but not necessarily with any particular channel. Thus, various embodiments of the invention provide a generalized interface to send a status independent of particular channels. SSS 106 may employ a process similar to that described below in conjunction with FIG. 4 to perform at least some of its actions.

Third party 130 may include any computing device capable of connecting to network 105 to provide social networking information and/or receive a status of a user. Third party 130 may act substantially similar to client device 101, except that third party 130 may be an external service (e.g., web service, application service) configured to provide the status of a user over a variety of other channels. For example, third party 130 may subscribe to receive at least one status for at least one user. Third party 130 may act as a recipient or may forward requests by other recipients. The third party 130 may receive the status over a variety of channels. In one embodiment, third party 130 may request a status by polling SSS 106 using, for example, an Application Programming Interface (API), such as XML-RPC, or the like. Third party 130 may provide this status in a variety of formats to at least one other device. For example, third party 130 may show the user's status on the user's home page in a third party website, for example.

Although FIG. 1 illustrates SSS 106 or third party 130 as a single computing device, the invention is not so limited. For example, one or more functions of SSS 106 or third party 130 may be distributed across one or more distinct computing devices. For example, sending statuses between users of a social network, managing various social networking tasks, including sharing of content, managing IM session, SMS messages, email messages, posting of content, or the like, may be performed by a plurality of computing devices, without departing from the scope or spirit of the present invention.

Illustrative Client Environment

Figure 2:
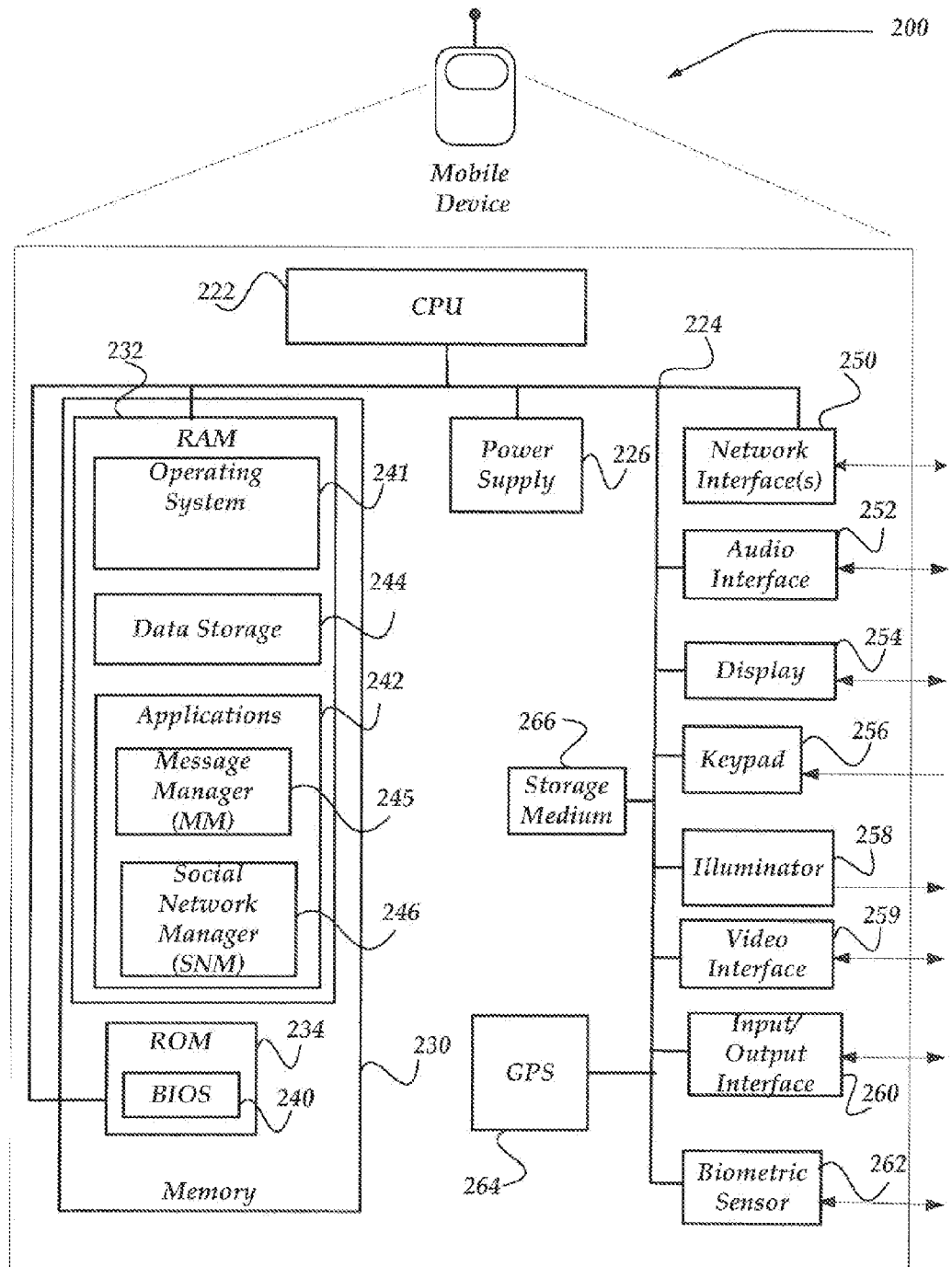
FIG. 2 shows one embodiment of a client device that may be included, in a system implementing one or more embodiments of the invention.

FIG. 2 shows one embodiment of client device 200 that may be included in a system implementing one or more embodiments of the invention. Client device 200 may include many more or less components than those shown in FIG. 2. However, the components shown are sufficient to disclose an illustrative embodiment for practicing the present invention. Client device 200 may represent, for example, mobile devices 102-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements, and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user, datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive, input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may, through other components, provide other information that can be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of mobile device 200. The information may then be provided to another device, including being sent as part of a header during a communication, sent upon request, or the like. Moreover, data storage 244 may also be employed to store content and/or social networking, information including text messages, address books, group member lists, or the like. At least a portion of the content may also be stored on storage medium 266, such as a disk drive, removable storage, or the like within mobile device 200.

Applications 242 may include computer executable instructions which, when executed by mobile device 200, provide such functions as calendars, contact managers, task managers, transcoders, database programs, word processing programs, screen savers, security applications, spreadsheet programs, games, search programs, and so forth. Applications 242 may further include Message Managers (MM) 245 and Social Network Manager (SNM) 246.

SNM 246 includes any component configured to create social network information, send/receive social network information (e.g., over network interface 250), or otherwise manage social network information. In one embodiment, SNM 246 may receive a definition of s social network (e.g., as an address book, a user relationship graph, a buddy list) over network interface 250 from, for example, SSS 106 of FIG. 1. SNM 246 may store this information storage medium 266, RAM 232, or other data source. SNM 246 may provide the information over display 254, or the like. SNM 246 may enable selection of a community and/or a user from a social network. In one embodiment, SNM 246 may pull the social network information over network interface 250 periodically. In another embodiment, SNM 246 may pull the information as needed (e.g., when a user requests the information).

MM 245 represents any of a variety of applications configured to transmit, receive, and/or otherwise process messages and other network content, including, but not limited to SMS, MMS, IM, email, VOIP, browsers, or the like, and to enable telecommunication with another user of another networked device. For example, MM 245 may include any of a variety of browser applications, which may be run under control of operating system 241 to enable and manage requesting, receiving, and rendering markup pages such as WAP pages (Sometimes referred to as WAP cards), SMGL, HTML, HDML, WML, WMLScript, JavaScript, and the like.

MM 245 may further include an IM application that is configured to initiate and otherwise manage an instant messaging session, including, but not limited to AOL Instant Messenger, Yahoo! Messenger, .NET Messenger Server, ICQ, and the like. In one embodiment, the IM application within MM 245 may be configured to employ a SIP/RTP to integrate IM/VOIP features. For example, the IM application may employ SIMPLE (SIP for Instant Messaging and Presence Leverage), APEX (Application Exchange), Prim (Presence and Instant Messaging Protocol), Open XML-based XMPP (Extensible Messaging and Presence Protocol), more commonly known as Jabber and OMA (Open Mobile Alliance)'s IMPS (Instant Messaging and Presence Service) created specifically for mobile devices, or the like.

MM 245 may also include text messaging application(s) that enables client device 200 to receive and/or send text messages to another device. In one embodiment, the text messaging application(s) may also provide an alerting mechanism that indicates to a user of client device 200 when a text message is received. The text messaging application(s) may also allow the user to compose a text response message, and to send the text response message over a network. The text messaging application(s) may operate to manage SMS text messages, MMS messages, Enhanced Message Service (EMS) messages, or the like, where graphics, video clips, sound files, or other content may be communicated between client device 200 and another networked device.

In one embodiment, MM 245 may also send information about an availability of client device 200 and/or the availability of MM 245 to receive a status over a channel. In one embodiment, when MM 245 is activated (e.g., when client device is powered on), MM 245 may send a message over network interface 250 indicating that MM 245 is able receive a message (e.g., a status) over network interface 250. In one embodiment, MM 245 may also send information about client device 200, including a location of client device 200. MM 245 may send a GPS coordinate received from GPS component 264 over network interface over network interface 250.s In any event, any one or more of the messaging applications within MM 245 may be employed to enable a user of client device 200 to create a status message, select a social network, community in the social network, and/or a recipient in the social network, and send the status message over network interface 250. In one embodiment, the status message may be created and/or otherwise entered by a user of client device 200 using a variety of mechanism, including video interface 259, audio interface 252, biometric sensor 262, or the like. In one embodiment, MM 245 may retrieve social networking information and information about a recipient from SNM 246. MM 245 may employ a process similar to that described below in conjunction with FIG. 5 to perform at least some of its actions.

In one embodiment, MM 245 may provide an API, or other interface to other components of client device 200 to provide the status. For example, in one embodiment, other applications and/or components of applications 242 may receive a reading from biometric sensor 262. Biometric sensor 262 may be any component configured to receive an analog or digital input about a user, including a user temperature, thermo-graphical image, pulse, electrical impedance, fingerprint, blood glucose level, retina scan, a combination of one or more of the inputs, or the like. In one embodiment, the input may be converted into a label, image, or other information. The input and/or the converted information may be sent to MM 245, using for example, an API. MM 245 may provide the status over network interface 250.

In one embodiment, other applications and/or components of applications 242 (including MM 245) may intermittently poll for information from other components of client device, such as GPS source 264, and/or video interface 259. Based on this polled information, the other application may determine a status of the user. The status may then be sent to MM 245 for further processing.

Illustrative Server Environment

Figure 3:
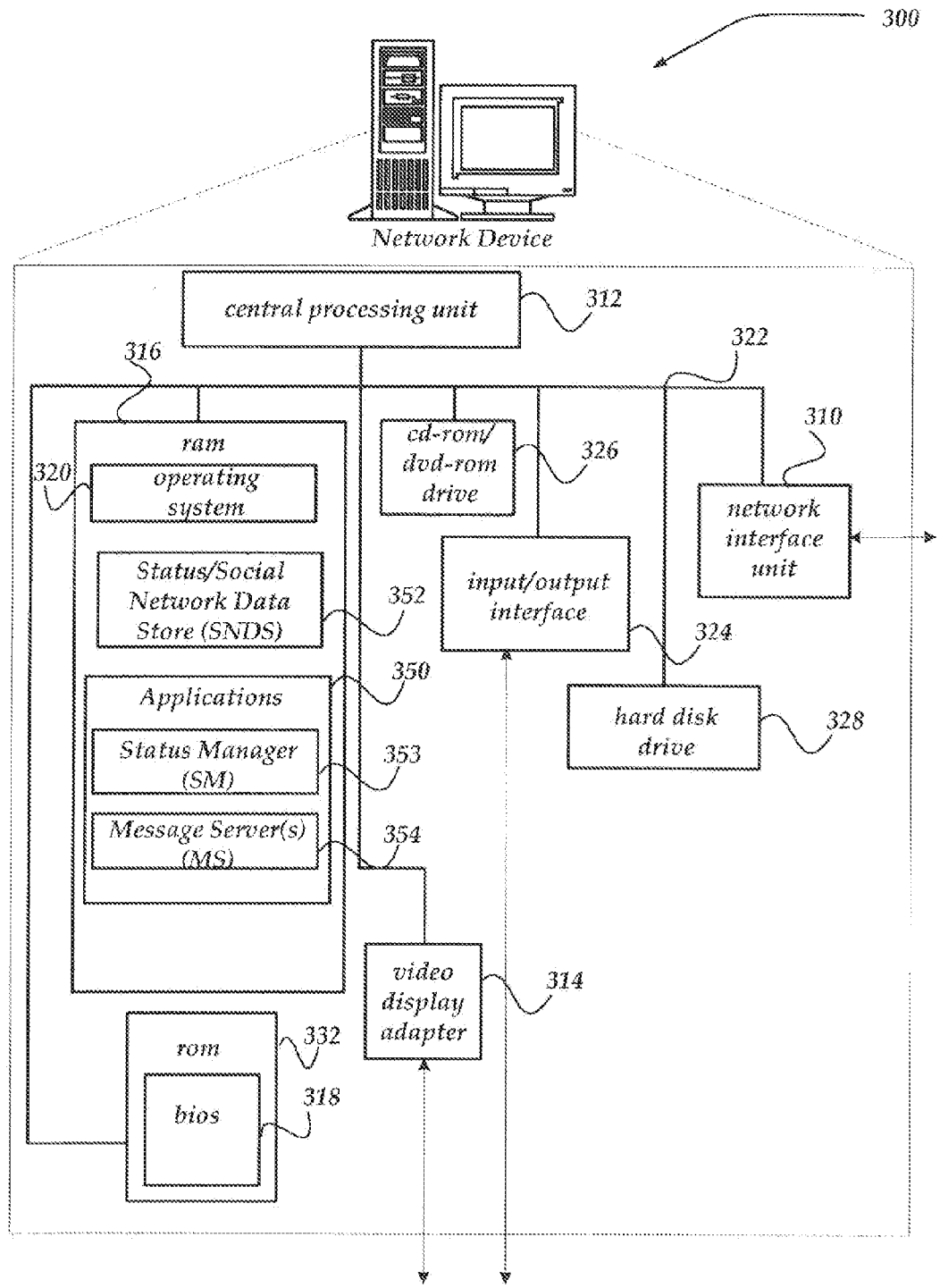
FIG. 3 shows one embodiment of a network device that may be included in a system implementing one or more embodiments of the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, SSS 106 of FIG. 1.

Network device 300 includes processing unit 312, video display adapter 314, and a mass memory, all in communication with each other via bus 322. The mass memory generally includes RAM 316, ROM 332, and one or more permanent-mass storage devices, such as hard disk, drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed, for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One, or more applications 350 are loaded into mass memory and run on operating system 320. Examples of application programs may include transcoders, schedulers, calendars, database programs, word processing programs, HTTP programs, including XmlHTTPRequest (XHR), Asynchronous JavaScript and XML (AJAX), JavaScript Object Notation (JSON) programs, customizable interface programs, IPSec applications, encryption programs, security programs, account management, and so forth. Status Manager 353 and Message Servers 354 may also be included as application programs within applications 350.

Status/Social Network Data Store (SNDS) 352 stores a plurality of received content. In one embodiment, SNDS 352 may be a database, a file structure, or the like. SNDS 352 may store a definition of a social network, including the relationship between members of the social-network, as, for example a graph, tree, list, or other data structure. SNDS 352 may store unique IDs for all members of a social network, or the like. SNDS 352 may also store at least one status associated with a member. For example, a member may send the member's status to network device 300 over network interface 310 using a channel. SNDS 352 may associate the status with the member, and may provide the status to another component for further processing.

Status Manager (SM) 353 includes any component configured to receive a status (e.g., over network interface 310 or from SNDS 242), determine a recipient, and/or modify the status based on, among other things, social network information, preferences of a recipient, receiving device information, channel information, or the like. SM 353 may be configured to retrieve the identity of the recipient from SNDS 352. SM 353 may determine a channel to send the status based, for example, on an available channel, on a preference of the user and/or recipient, or the like. For example, when a client device associated with a member of a social network become activated, the client device may send a message to SM 353 over network interface 310 to indicate that the client device is active and that the channel associated with the client, device is available. Similarly, when a receiving application program becomes active, the program may also send a similar message. In any case, SM 353 may direct MS 354 to send the status to at least one recipient over a network interface 310 using a (available) channel.

Message Server(s) (MS) 354 may include virtually any communication server that may be configured to enable communications between networked devices, including email servers, Simple Mail Transfer Protocol (SMTP) servers, Short Message Peer-to-Peer Protocol (SMPP) servers, SMS servers, various text messaging servers, VOIP servers, IM servers, MMS servers, RSS servers, audio servers, web servers, or the like. MS 354 may employ SNDS 352 to store or otherwise manage content that may be communicated over a network. MS 354 may be configured to communicate a status from SM 353. SN 353 and/or MS 354 may employ a process similar to that described below in conjunction with FIG. 5 to perform at least some of their actions.

Generalized Operation

Figure 4:
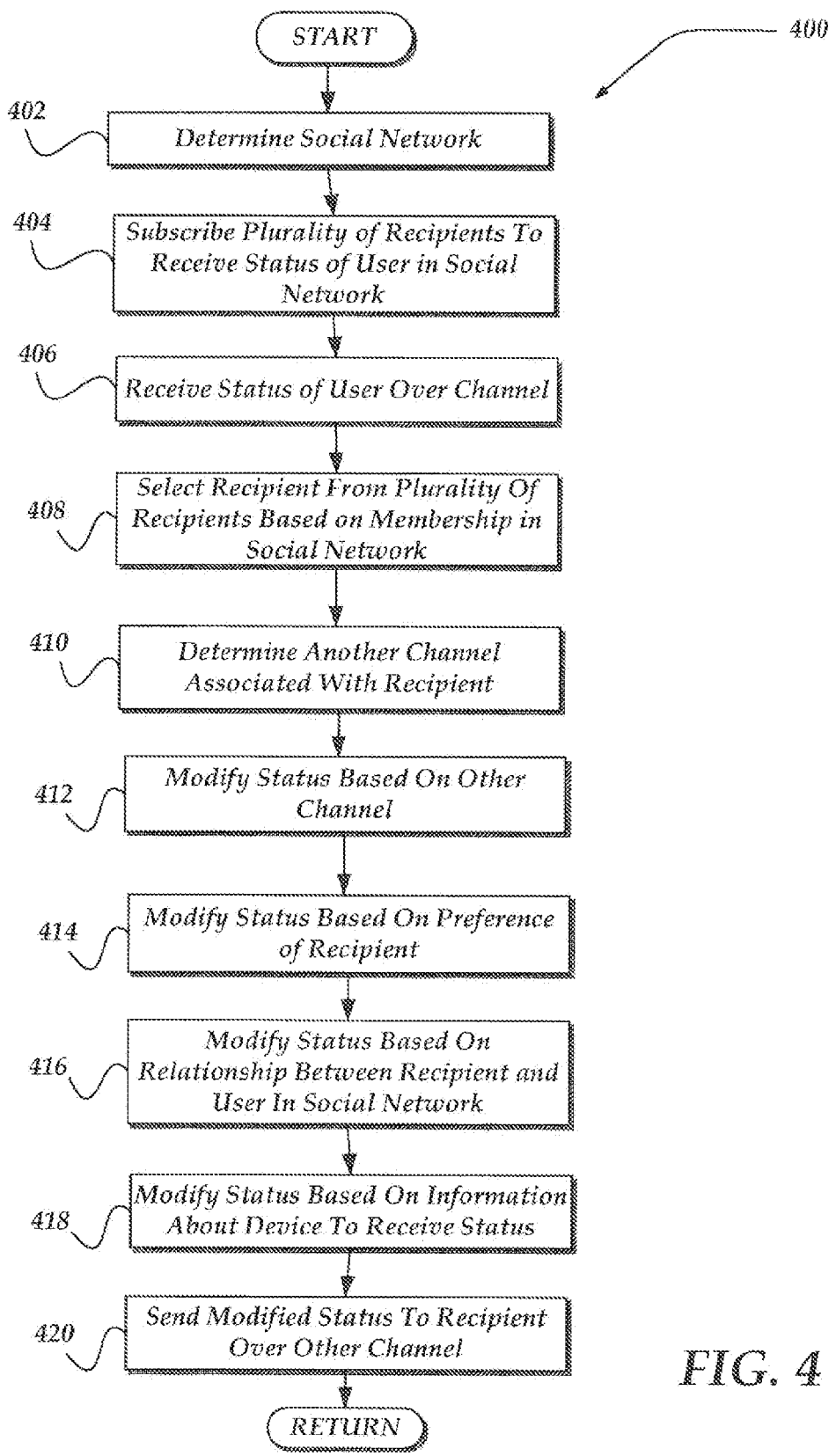
FIG. 4 illustrates a logical flow diagram generally showing one embodiment of a process for sending a status of a user in a social network.

The operation of certain aspects of the invention will now be described with respect to FIGS. 4-5. FIG. 4 illustrates a logical flow diagram generally showing one embodiment of a process for sending a status of a user in a social network. Process 400 may be performed by SSS 106 of FIG. 1.

Process 400 begins, after a start block, at block 402 where a social network is determined. In one embodiment, the social network may be determined based on information about a plurality of other social networks, including in the form of address books, buddy lists, user databases, or other lists of users. The information may be received over a network, for example, from a third-party, from a database, form an email server, IM server, or the like. The information about the plurality of other social networks may be used to combine into the determined, social network. For example, a list of all relationships between all members may be created from the information. In one embodiment, some of the plurality of other social networks may have different members. For example, a user who intends to send a status may be in one of the social networks, while a recipient may be in a completely different social network. However, the combined social network may include both the user and the recipient. Processing then continues to block 404.

At block 404, at least one recipient is subscribed, to receive a status of a user in a social network. In one embodiment, the recipient may be a member of the social network. In one embodiment, the user may be in a contact list of the recipient. In one embodiment, the recipient may subscribe himself to receive the status of the user. For example, the recipient may indicate that the recipient wishes to receive a status of the user in the social network. In one embodiment, the indication may be sent from an application program on a client device to a status sharing manager or the like. The user may optionally subscribe the recipient to receive the status. In one embodiment, when the recipient is subscribed, the recipient may also indicate the media format of the status that the recipient wishes to receive, the mode of delivery, or the like. In one embodiment, a table entry, database entry or the like, indicating that the recipient is to receive a status of the user is maintained, updated, or the like, based on the subscription. Processing next continues to block 406.

At block 406, a status of the user is received over a channel. In one embodiment, a user inputs the status using an application program, interface, or the like, on a client device. The user sends the status of the user over the channel to a server, such as SSS 106 of FIG. 1. In one embodiment, the channel may include an application program protocol. The channel may be associated with a particular network protocol, a particular application type for sending the status, an application type for receiving the status, a particular operating system or other platform information associated with the recipient of a status over the channel, or the like. Processing next continues to block 408.

At block 408, a recipient is selected from a plurality of recipients based on a membership of the recipient in the social network. In one embodiment the plurality of recipients may be determined as those members of the social network who have subscribed to receive a status from the user. In one embodiment, the recipient may be selected based on a degree of separation between the recipient and the user in the social network. For example, the recipient may be one degree of separation from the user (e.g., the recipient is in the user's address book, buddies list, social network of friends). In another embodiment, the recipient may be selected based on the media format of the status being sent, the content of the status being sent, the priority of the status being sent, or the like. For example, a message of an emergency type may be sent to all recipients, or recipients associated with an emergency care group in a social network. Processing next continues to block 410.

At block 410, another channel associated with the recipient is determined. In one embodiment, the other channel is different from the channel used to send the status from the user. For example, the user may send the status to a status sharing server over one application protocol (e.g., IM). The status sharing server may send the status over the other channel using a different application protocol (e.g., SMTP).

In one embodiment, a recipient may be associated with a plurality of channels. For example, a user may have the recipient identified in a plurality of address books, buddy lists, or other list of users. Each list may be associated with a different channel for communicating with the members in the list. In one embodiment, the different channels associated with a recipient may be aggregated in the social network. For example, user A may have the recipient in an IM buddy list, but user B may have the recipient in an phone book on a user B's mobile phone. Both the IM channel, and the phone channel (e.g., phone, SMS) may be associated with the recipient in the social network. In one embodiment, at least one of the aggregated channels is selected to be used to send the status of the user to the recipient.

In one embodiment, the selection of the other channel is based on an availability of the other channel. For example, the recipient may be actively using an application program (e.g., email, IM, logged into a social networking website). In an alternate embodiment, the other channel may also be based on the media format of the status, content of the status, and/or priority of status. For example, a message of an emergency type and/or high priority may be determined to be sent over an emergency channel, such as over a VOIP and/or Private Branch Exchange (PBX) phone channel to a telephone number. For example, a text status may be converted to a voice status using a text-to-voice conversion, and may be sent use a PBX system. Other relevant information, such as location, time, or the like associated with the device may also be sent with the status. Processing next continues to block 412.

At block 412, the status is modified based on the other channel. In one embodiment, the status may be received as a first media format. The first media format may be appropriate for communication over the channel used by the user to send the status. The status may be converted into a second media format appropriate for communication over the other channel. For example, the status may be received as HTML over an HTTP channel. The status may be converted into plain text (e.g., removing tags). The plain text message may be sent over an SMS channel.

In general, the determination of the second media format may be based on a variety of mechanisms and/or factors. In one embodiment, a media format may be based on a mapping (e.g., pre-defined mapping, generated mapping, etc) between a type of channel and a media format. For example, a mapping may associate a plain text format with an SMS channel, an HTML format with an email channel, a voice format with a VOIP channel, a picture or image format with a channel enabled to send messages to a video enabled mobile device, or the like. In one embodiment, the status may be converted using a text-to-voice if the first media format is text, and the second media format is voice. In one embodiment, the status may be converted using a voice-to-text if the first media format is voice, and the second media format is text. Processing next continues to block 414.

At block 414, the status is modified based on a preference of the recipient. In one embodiment, the received status may be modified from a received media format to another media format based on the preference. In one embodiment, the recipient may indicate that the recipient wishes to receive, media of a particular format, status associated with a particular area of interest (e.g., statuses with the keywords "film", or category of "film"), or the like. In one embodiment, the recipient may indicate that media of a particular format should be communicated over a particular type of channel. For example, the recipient may indicate that the recipient wishes to receive voice statuses that were originally sent over a VOIP channel, over an SMS channel. In another example, the recipient may wish to receive all statuses over an IM channel, and thus statuses are converted into, a format suitable for IM (e.g., plain text, XML). In another example, the status may be specified to be transcoded into a voice version. In another embodiment, the user and/or the recipient may specify that the status should also identify the channel over which the status was received. In general, any number of rules, criteria, or conditions may be used to specify the preference of the recipients. In one embodiment, the media format is include at least one of a text message format, a voice message format, an image format, a video format, a multimedia format, or the like. Processing next continues to block 416.

At block 416, the status is modified based on a relationship between the recipient and the user in the social network. In one embodiment, the status is partitioned/filtered based on a relationship between the user and the recipient in the social network. The status may be filtered based on a membership of the recipient and/or the user in a group/community in the social network For example, the status may be a composite status of "at school/bored/math class/see my blog post about math," wherein the character "/" represents a separator between statuses, but in other embodiments other characters or separators may also be used. Each of the status may be associated with one format, level of access, or the like. The composite status may be partitioned into "at school" for those recipients in a general community of the social network, "at school/bored"

for those recipients in a friends list of the user, "at school/bored/math class" for those friends who are also in the same community associated with a same class as the user, or the like. Moreover, a recipient in a community about a special interest (e.g., "how to excel at math") may receive only a particular type of status (e.g., "see my blog post about math").

In one embodiment, the status may be a hierarchical status, such as an ordered list, tree, or the like. Partitioning may comprise providing statuses from a level of the hierarchy of statuses based on a social network relationship between the user and the recipient. In one embodiment, the level of the hierarchy may be determined based on an inverse relationship of the degree of separation.

For example, a hierarchical status may be: "at school/bored/math class/see my blog post about math." For one degree of separation recipients, the level of the hierarchy may be determined to be 4: "at school/bored/math class/see my blog post about math." For two degrees, the level may be determined to be 3: "at school/bored/math class." For three degrees, the level may be determined to be 2: "at school/bored." In any case, processing next continues to block 418.

At block 418, the status is modified based on information about a device to receive the status. In one embodiment, the information may be converted into a media format appropriate for receipt by the device. For example, an HTML status may be converted into WML, before being sent to a mobile device. In another embodiment, the status may be converted to take into account the location of the device. In one embodiment, the location may be based on a GPS coordinate sent from the device, an IP address of the device, or the like. The status may be converted into a language specific to the location based on a machine translation technique, for example. Moreover, the status may include a time and/or date converted into a local time for the device. The status may also include a distance from the user who sent the status and the device's location based on a distance measure (e.g., Euclidian, Manhattan distance). Processing then continues to block 420.

At block 420, the status is sent to the recipient over the other channel. The status may be sent to the selected recipient using the specific protocol/mechanism particular to the channel. For example, an IM channel may use an IM client/forwarder to send the status over an IM protocol. In one embodiment, the status may be determined to be sent with a plurality of other statuses over a plurality of channels of the same type. In this embodiment, the status may be sent using a multi-plexed broadcasting mechanism, wherein the status is sent in parallel, in series, or the like. Combining the sending of a plurality of statuses using a multiplexed broadcasting mechanism may reduce the overhead in initiating the protocol, reduce other resource usages, or the like. In some embodiments, where the other channel supports multicasting, the status may also be sent using various multicasting mechanisms, including an IP multicasting, broadcasting, peercasting, or the like. In one embodiment, sending the status over the other channel may be delayed until the other channel is determined to be available. For example, the other channel may be a mobile device. The channel may determined to be available if the mobile device is activated, is within a certain range or the like.

In yet another embodiment, sending the status may include sending a history of statuses (e.g., the last N status). In one embodiment, conflicting statuses may be filtered out based, for example, on a time of creation of the status. For example, a more recent mood status of "Happy" may override an earlier mood of "Sad." The history of statuses may be sent to the recipient over the other channel as described above. In any case, processing then returns to a calling process for further processing.

In an alternate embodiment, the status, identity of the recipient, type of channels determined in process 400, or the like, may be saved, logged, analyzed, or the like. The saved information may be used to determine suggestions of, for example, possible recipients for a status, or the like. Processing then continues to block 410.

Figure 5:
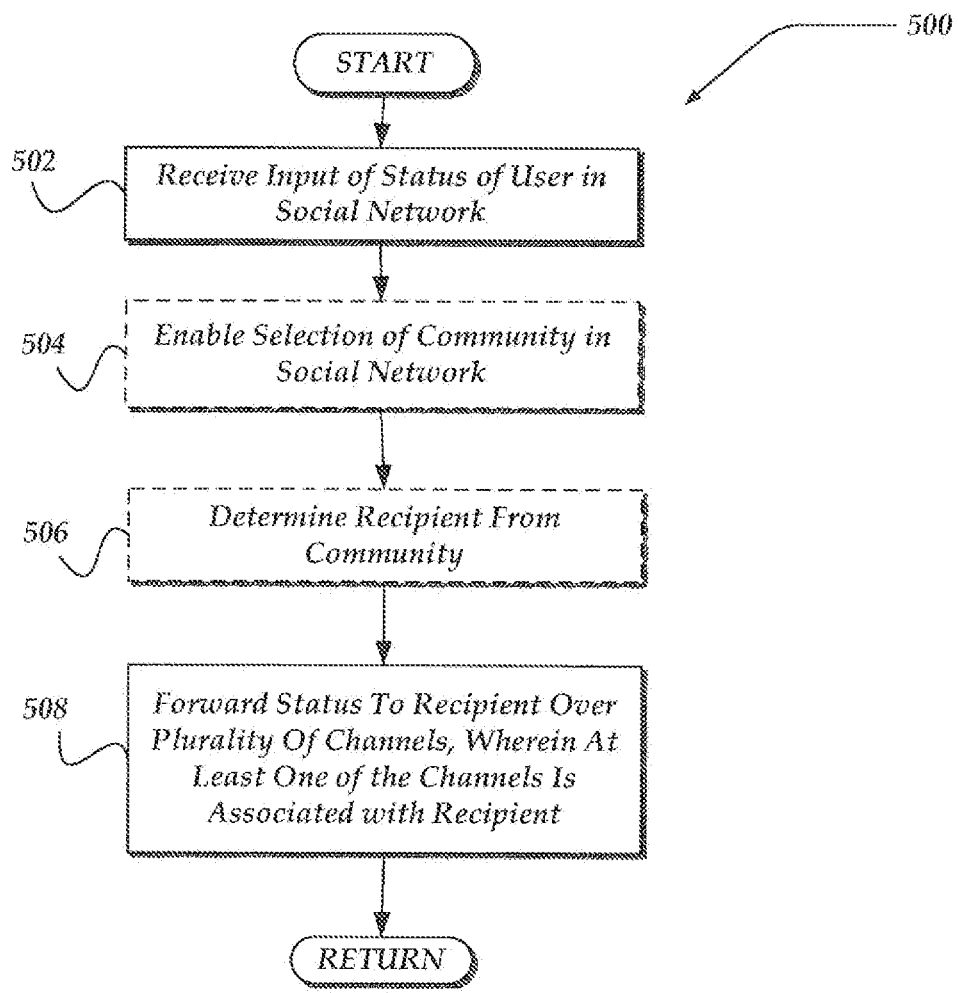
FIG. 5 illustrates another logical flow diagram generally showing one embodiment of a process for sending a status of a user in a social network.

FIG. 5 illustrates another logical flow diagram generally showing one embodiment of a process for sending a status of a user in a social network. Process 500 may be performed by client devices 101-104 and/or third party 130 of FIG. 1.

Process 500 begins, after a start block, at block 502 where an input of a status of a user in a social-network is received. The input may be entered using an application program on a client device, such as one of client devices 101-104 of FIG. 1, for example. The user may enter text, multimedia, or the like to indicate the user's status. For example, if the user is sad, the user may select a sad face icon, may take a picture of the user's face, may record an audio version of "I am sad," or the like. The user may select a phrase, image, or the like from a selection list, pull-down list, or the like. The list may be pre-populated with previous entries the user and/or members of the user's community have entered. In one embodiment, the information is associated with the user (e.g., the user's ID, the client device). In any case, after entry of the input, the input is received by the client device. Process next continues to block 504.

At block 504, a selection of a community in the social network is enabled. A list of the user's community may be provided on the client device. For example, a phone list may be provided to the user on a mobile, device. In another embodiment, a graphical view of the social network showing, for example, hierarchical groups in the social network may be presented using, for example, a tree view, or the like. The user is enabled to select the appropriate community using a variety of mechanisms, including, voice input, key entry input, touch screen input, or the like. Processing then continues to block 504.

At block 506, a recipient to receive the status is selected from the community. In one embodiment, the user is enabled to select at least one of the recipient from the selected community. For example, a contact list may be provided, and the user may be enabled to select the recipient from the list, using, for example, a scroll-and-select method, a touch screen input, a key entry input, or the like. In one embodiment, an identifier of the recipient is received by the client device. Processing next continues to block 508.

As shown, blocks 504 and/or 506 are optional and may not be performed. In this embodiment, processing continues from block 502 to block 508. In one embodiment, the recipient is determined automatically, as described in block 408 of FIG. 4. In another embodiment, a recipient from default list of recipients (e.g., pre-configured by the user) may be used as the recipient.

At block 508, the status is forwarded to the recipient over a plurality of channels, wherein at least one of the plurality of channels is associated with the recipient. In one embodiment, the status may be forwarded over a network to a status sharing server, over a first channel. The server may select at least one other channel, and may send the status to the recipient over the other channel. For example, the client device may send the status over an IM protocol, and the server (e.g., SSS 106) may send the status over an SMTP protocol to the recipient. The process for forwarding the status is described in more detail in process 400 of FIG. 4, above. In another embodiment, the client device may send the status directly to the recipient over a plurality of channels. For example, in one embodiment, the client device may also act as a status sharing server, and may select for example, an IM channel and an SMS channel to send the status. The client device may send the status over the selected channels. Processing then returns to a calling process for further processing.

It should be noted that, while process 500 is described as operating on one recipient, process 500 may operate on a plurality of recipients without departing from the scope of the invention. For example, at block 504 a plurality of communities may be selected. At block 506, a plurality of recipients may be selected. At block 508, a status may be forwarded to a plurality of recipients over at least one channel. For example, the status may be sent to a server over an IM channel. The status may then be sent to a first and second recipient over an SMS channel. Processing then continues as described above.

Accordingly, blocks of the flowchart illustration support combinations of means for performing the specified actions, combinations of steps for performing the specified actions and program instruction means for performing the specified, actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
    enabling, by a processor, a selection of at least one recipient for at least one status of a user in a social network;
    determining, by the processor, a plurality of application protocols associated with the at least one recipient based on information about the at least one recipient in a plurality of address books of the user; and
    selecting, by the processor, an application protocol from the plurality of application protocols based at least on an availability of the application protocol, wherein the at least one status is forwarded to the at least one recipient over a network using the selected application protocol.

2. The method of claim 1, wherein the selection of the at least one recipient further comprises selecting a community in the social network, wherein the at least one recipient is selected from the community.

3. The method of claim 1, further comprising modifying the at least one status for forwarding to the at least one recipient based on at least one of:
    a preference of the at least one recipient;
    a relationship between the at least one recipient and the user;
    information regarding a device that receives the at least one status for the at least one recipient;
    at least one of the plurality of application protocols; and
    a channel that is operative to forward the at least one status to the at least one recipient.

4. The method of claim 1, wherein the at least one recipient is a member of the social network.

5. The method of claim 1, further comprising:
    receiving the at least one status over a channel that communicates via at least one of the plurality of application protocols; and
    forwarding the at least one status to the at least one recipient over another channel that communicates via at least one of the plurality of application protocols.

6. A computing device comprising:
    a transceiver device to send and receive data over a network; and
    a processor in communication with the transceiver device and executing instructions comprising:
        receiving, by the processor, at least one status of a user in a social network;
        receiving, by the processor, a selection of at least one recipient for the at least one status of the user;
        determining, processor, a plurality of application protocols associated with the at least one recipient based on information about the at least one recipient in a plurality of address books of the user; and
        selecting, by the processor, an application protocol from the plurality of application protocols based at least on an availability of the application protocol, wherein the at least one status is forwarded to the at least one recipient over the network using the selected application protocol.

7. The computing device of claim 6, wherein the selection of the at least one recipient further comprises selecting a community in the social network, wherein the at least one recipient is selected from the community.

8. The computing device of claim 6, wherein the processor further executes instructions comprising:
    modifying the at least one status for forwarding to the at least one recipient based on at least one of:
    a preference of the at least one recipient;
    a relationship between the at least one recipient and the user;
    information regarding a device that receives the at least one status for the at least one recipient;
    at least one of the plurality of application protocols; and
    a channel that is operative to forward the at least one status to the at least one recipient.

9. The computing device of claim 6, wherein the at least one recipient is a member of the social network.

10. The computing device of claim 6, further comprising:
    receiving the at least one status over a channel that includes at least one of the plurality of application protocols; and
    forwarding the at least one status to the at least one recipient over another channel that includes at least one of the plurality of application protocols.

11. A non-transitory computer readable storage media having a processor, the processor configured to execute executable instructions for managing communication over a network, the executable instructions comprising:
    enabling, by the processor, a selection of at least one recipient for at least one status of a user in a social network;
    determining, by the processor, a plurality of application protocols associated with the at least one recipient based on information about the at least one recipient in a plurality of address books of the user; and
    selecting, by the processor, an application protocol from the plurality of application protocols based at least on an availability of the application protocol, wherein the at least one status is forwarded to the at least one recipient over the network using the selected application protocol.

12. The media of claim 11, wherein the selection of the at least one recipient further comprises selecting a community in the social network, wherein the at least one recipient is selected from the community.

13. The media of claim 11, further comprising modifying the at least one status for forwarding to the at least one recipient based on at least one of:
- a preference of the at least one recipient;
- a relationship between the at least one recipient and the user;
- information regarding a device that receives the at least one status for the at least one recipient;
- at least one of the plurality of application protocols; and
- a channel that is operative to forward the at least one status to the at least one recipient.

14. The media of claim 11, wherein the at least one recipient is a member of the social network.

15. The media of claim 11, further comprising:
- receiving the at least one status over a channel that communicates via at least one of the plurality of application protocols; and
- forwarding the at least one status to the at least one recipient over another channel that communicates via at least one of the plurality of application protocols.

* * * * *